United States Patent [19]

Brede et al.

[11] Patent Number: 5,255,938
[45] Date of Patent: Oct. 26, 1993

[54] TUBULAR GAS GENERATOR FOR AN INFLATABLE IMPACT CUSHION

[75] Inventors: Uwe Brede, Furth; Josef Kraft, Berg; Gerrit Scheiderer, Furth, all of Fed. Rep. of Germany

[73] Assignee: Dynamit Nobel Aktiengesellschaft, Troisdorf, Fed. Rep. of Germany

[21] Appl. No.: 800,011

[22] Filed: Nov. 29, 1991

[30] Foreign Application Priority Data

Nov. 28, 1990 [DE] Fed. Rep. of Germany ....... 4037768

[51] Int. Cl.⁵ ...................... B60R 21/26; B21D 39/00
[52] U.S. Cl. .................... 280/736; 280/741; 29/516; 285/382; 403/326; 403/DIG. 7
[58] Field of Search ............. 280/736, 735, 741, 743; 102/530, 531, 481; 29/515, 516, 517, 713; 138/92 R; 220/8, 426; 285/382, 424, 901; 403/326, DIG. 7, 317

[56] References Cited

U.S. PATENT DOCUMENTS

| | | | |
|---|---|---|---|
| 2,487,512 | 11/1949 | Berger | 29/516 |
| 2,851,288 | 9/1958 | Kinhead | 285/424 |
| 3,342,366 | 9/1967 | Defauw | 29/516 |
| 4,005,876 | 2/1977 | Jorgensen et al. | 280/741 |
| 4,158,696 | 6/1979 | Wilhelm | 280/736 |
| 4,200,615 | 4/1980 | Hamilton et al. | 422/166 |
| 4,858,951 | 8/1989 | Lenzen | 280/741 |
| 5,058,921 | 10/1991 | Cuevas | 280/736 |

FOREIGN PATENT DOCUMENTS 4001864 8/1990 Fed. Rep. of Germany .

Primary Examiner—Margaret A. Focarino
Assistant Examiner—Paul Dickson
Attorney, Agent, or Firm—Antonelli, Terry, Stout & Kraus

[57] ABSTRACT

A gas generator is provided with an outer tube and an inner tube arranged coaxially within the outer tube. The pressure gas-generating charge is accommodated in the inner tube, the charge being ignited by an ignition unit. The generator is closed at the ends in a gas tight manner by closure covers, which are surrounded laterally by the end sections of the outer tube. On the inside of the closure covers there is in each case a recess for accepting the ends of the inner tube. The recesses hold the inner tube centered in the outer tube. Each cover is further provided with a peripheral groove, in which interior projections, directed inwards, and formed by multiple notching by means of a notching tool, engage. These projections, for their part, are arranged on the inner peripheral surface of the outer tube in the end sections thereof.

8 Claims, 2 Drawing Sheets

TUBULAR GAS GENERATOR FOR AN INFLATABLE IMPACT CUSHION

BACKGROUND OF THE INVENTION

This invention relates to a tubular gas generator, in particular a tubular gas generator for an inflatable impact cushion such as an air bag of a motor vehicle.

A (tubular) gas generator is disclosed in U.S. Pat. No. 4,005,876, which has an outer tube, in a wall (jacket) of which there are arranged gas outlet openings and the ends of which are closed. In the outer tube there is located an inner tube, also provided in its jacket with gas outlet openings, the outer diameter of the inner tube which is smaller than the inner diameter of the outer tube, so that between the two eccentric tubes there forms an intermediate chamber for receiving a filter and cooling wire mesh. The inner tube, the axial length of which is less than that of the outer tube, is filled with (pressure-)gas-producing material (also called pressure gas-generating charge, for example in the form of pellets), which is ignited by an ignition unit. The gas forming when igniting the gas-producing material passes via the gas outlet openings of the inner tube through the filter material, in order to arrive outside, via the gas outlet openings, in the outer tube. The gas generator is, in the case of use for an impact protection gas cushion, arranged in a housing open at one side, with this opening being closed by a folded fabric, the actual inflatable gas cushion.

Arranged on one axial end of the two tubes there is a closure cover connecting the tubes to each other, which is surrounded by the outer tube in its end section. In the peripheral surface of the closure cover there is formed a peripheral groove, in the region of which the outer tube is pinched-in. The inner side of the closure cover is provided with a recess, into which the axial end of the inner tube is inserted. With the ignition of the gas-producing charge, relatively high pressure occurs in the inner tube and in the intermediate chamber between the two tubes. The closure cover, anchored, as described above, to the outer tube, must be able to resist this high pressure. Because of the circular arc-shaped formation of the peripheral groove and peripheral interior projection arising out of the contraction there is the danger that closure cover, possibly tilting under the action of the pressure, is loosened from the outer tube. This can lead to damage of the units arranged around the gas generator. The gas emerging via the loosened closure cover is not cleaned and therefore carries along residue from combustion, which can also cause damage. Finally a loosening of the closure cover acts negatively on the burning process and the gas development.

SUMMARY OF THE INVENTION

The underlying object of the invention is to create a gas generator, in particular a tubular gas generator for an inflatable impact cushion such as an air bag of a motor vehicle, in which the closure cover can be reliably secured against loosening at the axial ends of the outer tube, even when the closure cover tilts.

In order to achieve this object with the invention a gas generator is proposed which has the following features:
  an outer tube;
  a closure cover at both ends of the outer tube, wherein the outer tube at least partially surrounds the closure covers laterally, and
  a peripheral groove on the peripheral surface of each closure cover, which groove receives interior projections directed inwardly from the end section of the outer tube surrounding the respective closure cover;
  wherein the interior projections being formed as individual, punched, substantially V-shaped outer tube deformations, directed inwardly, by multiple notching of each end sections of the outer tube, surrounding the respective closure covers, in the region of the peripheral grooves of the closure cover.

The interior projections are formed according to the invention by multiple notching of the end sections of the outer tube by means of a notching tool. By pressing in (wedging-inward) the outer tube by means of notching or pinching tools, V-shaped interior projections, when seen in cross-section through the outer tube, form as a result of the local tube deformation, the ends of which projections, tapering to a point, preferably rest on the base of the peripheral groove in each of the closure covers. When notching the outer tube, web sections are also simultaneously cut out or punched from the outer tube. In this process the closure cover forms the mould for producing these projections. The (axial) width of the interior projections is accordingly the same as the width of the peripheral groove in each closure cover. In this way radial movement as well as axial movement of the closure covers and thus movement of the inner tube relative to the outer tube are prevented.

The advantage of the formation of the interior projections by multiple notching of the outer tube end sections with closure covers inserted therein consists in that—relative to the longitudinal extent of the tubular gas generator—radial side surfaces of the interior projections rest on the radial side surfaces of the peripheral grooves. The peripheral groove has, in this process, a rectangular cross section with a groove base extending along the periphery, and radial side inner surfaces extending at right angles thereto. When applying an axial force to the closure cover, such as occurs with the combustion of the gas-developing charge, no force components act on the interior projections in the radial direction, since the contact surfaces between the interior projections and the peripheral grooves extend transverse to the direction of force. With an axial movement or with a tilting of the closure cover, the interior projections are therefore subject "to shearing"; it is just these shearing stresses which are resisted in a particularly effective manner, however, by the interior projections formed by notching of the outer tube.

Preferably the outer tube projects at its ends in each case beyond the closure cover, with this annular extension or projection being flanged or laid over the closure cover edge. Through the flanging or laying over of the outer tube ends an additional holding force is applied to the closure cover. Furthermore, the rigidity increases and thus the strength of the connection between the closure covers and the outer tube increases. The flanging or laying over of the outer tube ends acts advantageously towards an increase in the resistance capacity of the outer tube end sections when the closure cover tilts; because through the laying over an enlarged bending height is achieved at the tube ends, which counteracts the expansion of the ends of the outer tube when the closure cover tilts.

With a double tube construction with an outer and inner tube as well as the securing according to the invention of the closure cover on the outer tube, it is advantageously provided that each closure cover has on its inner side facing the end of the inner tube a recess, into which is inserted an end section of the inner tube containing the gas-producing material and which recess surrounds the inner tube at the one end section.

BRIEF DESCRIPTION OF THE DRAWINGS

An embodiment of the invention is described in greater detail with reference to the accompanying drawings, wherein.

DETAILED DESCRIPTION OF THE INVENTION

Figure 1:
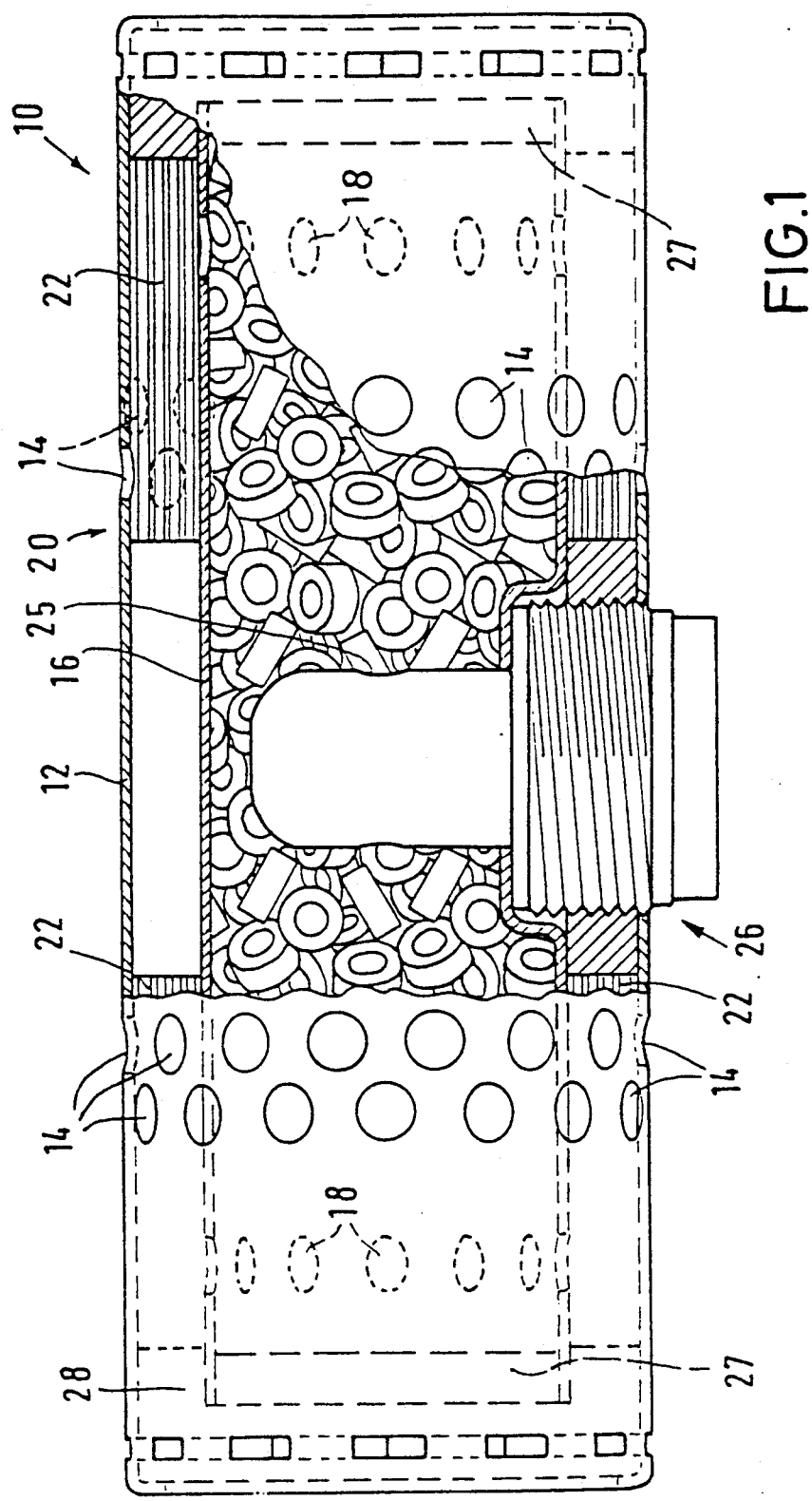
FIG. 1 is a side view of a gas generator partially in section, with a central region being shown in a longitudinal section.

In FIG. 1 there is shown a tubular gas generator 10 especially suitable for a motor vehicle air bag. The tubular gas generator 10 has a metal outer tube 12, in the jacket of which there are formed several gas outlet openings 14. The gas outlet openings 14 are evenly distributed over four peripheral rows in the outer tube 12. The gas outlet openings 14 are located essentially in the central section of the outer tube 12. Within the outer tube 12 there is accommodated an inner tube 16 of metal arranged coaxially to the outer tube. In the axial end sections of the jacket of the inner tube 16 there are also formed gas outlet openings 18, with these gas outlet openings 18 being distributed evenly over two peripheral rows in the region of the end sections of the inner tube 16. Between the gas outlet openings 14 of the outer tube 12 and the gas outlet openings 18 of the inner tube 16 there is therefore an axial spacing.

The outer diameter of the inner tube 16 is smaller than the inner diameter of the outer tube 12, so that between the outer and the inner tube there is formed an annular intermediate chamber 20. This annular intermediate chamber is filled up in its region extending between the gas outlet openings 14, 18 of both tubes 12, 16 with metal filters packs 22 (high-grade steel wire netting mats).

The inner tube 16 is filled up with gas-producing material based on sodium azide, which during combustion produces pressure gas. The gas-producing material, also called "pressure gas-generating charge", is present in the form of so-called pellets 24, which are accommodated in a random and disordered manner within the inner tube 16. An electrically actuated ignition unit 26 for igniting the pressure gas-generating charge is secured to both tubes 12, 16 and projects through an opening in the inner tube 16 partially into the inner tube.

The gas generator 10 is closed on the ends of the outer tube 12 by disc-like closure covers 28. At the ends of the inner tube 16 there are spring-elastic, compressible disc elements 27 of ceramic felt or ceramic fabric, which extend over the whole inner cross-sectional surface of the inner tube 16, and are supported, on the one hand, against the pellets 24 and, on the other hand, against the closure covers 28, wherein the elements hold the pellets 24 together with spring force. The metal closure covers 28 hold and also position the inner tube 16 in a manner which will be described in greater detail hereinafter.

The operation of the gas generator 10 shown in FIG. 1 is as follows: The electrically actuated ignition unit 26, which, in this exemplifying embodiment, is a so-called layer bridge igniter with primer material, is ignited by a defined electric pulse. (The construction and outer shape of the ignition unit 26 has no influence on the described object of the present invention). With the use of the tubular gas generator according to FIG. 1 as a pressure gas generator in an air bag this electric pulse, for example, is applied at the ignition unit 26 by closing an inertia switch, in the event of collision of the motor vehicle with another object. In the ignition device 26 a so-called booster charge is ignited; the ignition vapors produced in this process (flames, gas, hot combustion products) arrive, via openings 25 provided in the ignition device 26, in the inner chamber of the inner tube 16, where they ignite the (propellant charge-)pellets 24 evenly and at the same time. In the inner tube 16, depending on the embodiment, a varying quantity of gas-producing material is converted into gas with a pressure of approx. 200 bar. The hot gases, which consist of approx. 95% nitrogen, arrive via the gas outlet openings 18 at the ends of the inner tube 16, from which they pass to the filter packs 22. The filter packs 22 have the object of cooling the gases and cleaning particles (solid matter) and condensates. The gases cooled and cleaned in this manner emerge via the gas outlet openings 14 in the outer tube 12. The tubular gas generator 10 described here produces, in a time of approximately 30 milliseconds in a test volume of 60 dm3, a gas pressure of approximately 3 bar.

Figure 2:
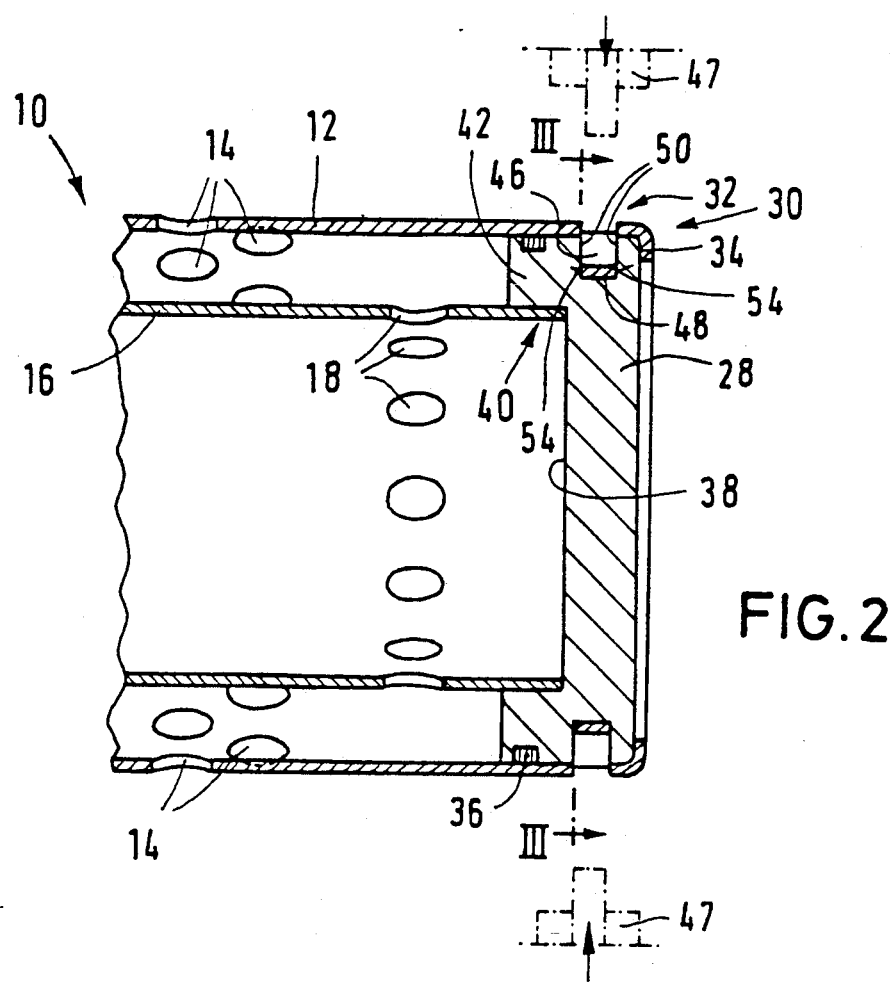
FIG. 2 is a longitudinal section through an end section of the gas generator according to FIG. 1.
Figure 3:
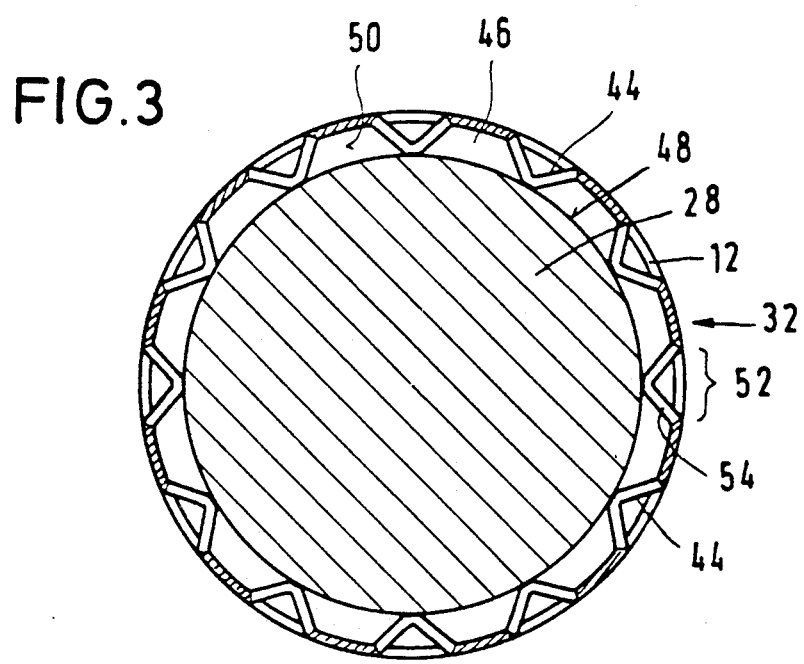
FIG. 3 is a cross-sectional view taken along the line III—III of FIG. 2.

With reference to FIGS. 2 and 3, there is shown the connection of a closure cover 28 with the outer tube 12 and the inner tube 16 in greater detail. For the sake of simplicity in FIG. 2, the pellets 24 and the spring elements 27 are not shown. The cover 28 shown in FIGS. 2 and 3 is essentially in the form of a disc and is inserted into the end 30 of the outer tube 12. In this way the end section 32 of the outer tube 12 surrounds the closure cover 28 laterally. The end of the outer tube 12 projecting over the cover 28 is flanged or laid over the peripheral edge of the closure cover, which is indicated by reference numeral 34. For gas-tight closure of the cover 28, relative to the inner surface of the outer tube 12, a sealing ring 36 is accommodated in a groove provided in the peripheral surface of the cover 28.

On its inner side facing the inner tube 16, the cover 28 is provided with a cylindrical recess 38. The recess 38 is concentric to the cover 28 and surrounds an end section 40 of the inner tube 16 from outside. The inner tube 16 is inserted with its end section 40 into the recess 38, wherein the tube rests with its annular front surface on the base of the recess 38 and is glued in the region of its end section 40 with the inner peripheral surface of the recess 38. The inner tube 16 is held centered by the closure cover 28; radial movements of the inner tube 16 relative to the outer tube 12 are avoided.

Through the formation of the recess 38 on the inner side of the closure cover 28 there forms an annular cylindrical centering projection 42, the annular thickness of which is equal to or slightly greater than the radial spacing between both tubes. By way of this centering projection 42 the radial forces forming with pressure gas generation and acting on the inner tube 16 are transferred to the outer tube 12, so that on the ends of the gas generator 10 through the centering projection 42 there is an increased stability.

In addition to the flanging 34 of the outer tube 12 the cover 28 is also secured on this tube or anchored with the tube by way of V-shaped inwardly projecting interior projections 44 on the inner side of the outer tube 12. The interior projections 44 are inserted or pushed into an annular peripheral groove 46, which is incorporated in the outer peripheral surface of the closure cover 28. The peripheral groove 46 has a rectangular cross-section, which is defined by the groove base 48 extending in the peripheral direction and the lateral inner surfaces 50 extending at "right angles" to the base and radially relative to the longitudinal extension of the tubular gas generator 10. The width of the peripheral groove 46 is thereby equal to the axial width of the interior projections 44. The interior projections 44 are evenly distributed over the periphery of the outer tube 12 at its end section 32. The ends of the V-shaped interior projections 44 tapering to a point lie on the bottom or base 48 of the peripheral groove 46. Therefore the interior projections 44 contribute to preventing radial movement of the closure cover 28, relative to the outer tube 12 and thus serve to prevent radial movement of the inner tube 16 relative to the outer tube 12. Because of the end sections 40 of the inner tube 16 being positioned within in the recesses 38 of the closure covers 28 and the anchoring of the covers by means of the interior projections 44 engaging in the peripheral grooves 46, radial movement of the tubes relative to each other is eliminated.

The peripheral groove 46 has an axial spacing with respect to the recess 38, with it not being arranged in the region of the annular centering projection 42, but being spaced from the projection and displaced in a direction toward the axial end of the outer tube 12.

The interior projections 44 shown in FIGS. 2 and 3 are formed by notching the outer tube end sections 32 by means of the notching tool indicated by dashed lines in FIG. 2 and designated by reference numeral 47, when the closure covers 28 are inserted Several V-shaped projections 44, shown in FIG. 3, are formed thereby in the jacket of the outer tube 12 along an (assumed) peripheral annular line in the end section 32, in which jacket there are local deformations of the outer tube 1 in its end section 32. As well as wedging over there also occurs a punching out of the peripheral sections 52 of the outer tube 12 along the presumed peripheral line, in which the V-shaped projections 44 are formed by notching or pinching the outer tube. The manufacturing process for the V-shaped projections 44 by notching the outer tube 12 with simultaneous use of the closure cover 28 acting mandrel or support mold, causes the narrow side surfaces 54 of the interior projections 44 to extend transverse to the longitudinal extension of the gas generator 10, therefore radially relative to the longitudinal axis of the outer tube 12. The side surfaces 54 (which are impact edges too) of the interior projections 44 lie at the side inner surfaces 50 of the peripheral groove 46. Thus the interior projections 44, when forces are acting axially on the closure cover, such as is the case with the ignition and combustion of the gas-producing material, are subjected to shearing action. The V-shaped interior projections 44 reliably resist, however, such shearing forces. The flanging or laying over 34 strengthens the end section 32 of the outer tube 12, which, additionally makes tilting of the closure cover 28 difficult.

What is claimed is:

1. A tubular gas generator for an inflatable air bag, which comprises
   an outer tube;
   closure covers at both ends of the outer tube, said outer tube at least partially surrounding lateral portions of the closure covers, and
   a peripheral groove on a peripheral surface of each closure cover, interior projections directed inwardly in an end section of the outer tube, surrounding a respective closure cover, said interior projections extending into said peripheral groove;
   the interior projections comprising individual, punched, substantially V-shaped outer tube deformations, directed inwardly by multiple notching of each end section of the outer tube, surrounding a closure cover, in the region of the peripheral groove of the closure cover.

2. A gas generator according to claim 1, wherein the outer tube extends at its ends in each case beyond a closure cover, with an annular flange of the tube being laid over an edge of a closure cover.

3. A gas generator according to claim 1 or 2, wherein there is arranged in the outer tube, an inner tube for receiving gas-producing material and each closure cover has on an inner side facing the end of the inner tube a recess, into which an end section of the inner tube is inserted and which surrounds the inner tube at the end section.

4. A gas generator according to claim 1 or 2, wherein the outer tube surrounds lateral portions of the closure covers, the interior projections are evenly distributed over a periphery of the outer tube, and ends of the interior projections contact a base of the peripheral groove.

5. A gas generator according to claim 4, wherein the interior projections have an axial width that is equal to an axial width of the base of the peripheral groove.

6. A gas generator according to claim 1, wherein each closure cover is provided with a sealing ring arranged within a peripheral surface of the closure cover to provide a gas-tight closure of the cover relative to an inner surface of the outer tube.

7. A gas generator according to claim 1 or 2, wherein the peripheral groove has a rectangular cross-section defined by a groove base extending in a peripheral direction and by lateral inner surfaces extending perpendicular to the base, the peripheral groove having a width equal to an axial width of the interior projections so that side surfaces of the interior projections lie at the lateral inner surfaces of the peripheral groove.

8. A gas generator according to claim 3, wherein the peripheral groove of each closure cover is axially spaced with respect to the recess on the inner side of the closure cover facing the end of the inner tube.

* * * * *